US006632369B2

(12) United States Patent
Cluggish et al.

(10) Patent No.: US 6,632,369 B2
(45) Date of Patent: Oct. 14, 2003

(54) MOLTEN SALT COLLECTOR FOR PLASMA SEPARATIONS

(75) Inventors: Brian P. Cluggish, San Diego, CA (US); Stephen F. Agnew, San Diego, CA (US); Sergei Putvinski, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/903,304

(22) Filed: Jul. 11, 2001

(65) Prior Publication Data

US 2003/0066793 A1 Apr. 10, 2003

(51) Int. Cl.[7] ......................... B01D 35/06; B01D 35/18; B03C 1/00

(52) U.S. Cl. ....................... 210/695; 210/748; 210/175; 210/198.1; 210/222; 210/243; 209/12.1; 209/127.2; 95/28; 96/1; 96/3

(58) Field of Search ................................ 210/222, 695, 210/243, 748, 175, 198.1; 209/12.1, 227, 127.2; 95/28; 96/1, 2.3

(56) References Cited

U.S. PATENT DOCUMENTS

| | | | | | |
|---|---|---|---|---|---|
| 3,722,677 | A | | 3/1973 | Lehnert | |
| 5,218,179 | A | | 6/1993 | Matossian | |
| 5,827,424 | A | | 10/1998 | Gillis | |
| 6,096,220 | A | * | 8/2000 | Ohkawa | 210/695 |
| 6,287,463 | B1 | * | 9/2001 | Ohkawa | 210/175 |

* cited by examiner

*Primary Examiner*—David A. Reifsnyder
(74) *Attorney, Agent, or Firm*—Nydegger & Associates

(57) ABSTRACT

A collector for use in removing metal ions from a plasma in a vacuum chamber includes a collector plate that is mounted inside the chamber and formed with an internal cooling channel. An injector introduces a dissociated salt into the chamber with a first throughput value, and it introduces a plasma including metal ions into the chamber with a lower second throughput value. A pump is used to pump a liquid coolant through the cooling channel to maintain the collector plate at a temperature that forms a portion of the salt as a protective layer on the collector plate, and causes the salt to thereafter deposit on the layer in a molten condition at a faster rate than evaporation therefrom to trap metal ions therein. The trapped metal ions are then removed with the molten salt from the chamber.

20 Claims, 2 Drawing Sheets

MOLTEN SALT COLLECTOR FOR PLASMA SEPARATIONS

FIELD OF THE INVENTION

The present invention pertains generally to methods and devices for collecting ions from a multi-species plasma. More specifically, the present invention pertains to methods and devices for collecting ions from a multi-species plasma after the ions of the plasma have been separated according to the respective masses of the constituent elements. The present invention is particularly, but not exclusively, useful for collecting the relatively low mass particles in a multi-species plasma.

BACKGROUND OF THE INVENTION

A plasma mass filter that is designed to separate low mass particles from high mass particles is disclosed in U.S. Pat. No. 6,096,220 which issued to Ohkawa for an invention entitled "Plasma Mass Filter" and which is assigned to the same assignee as the present invention. U.S. Pat. No. 6,096,220 is incorporated herein by reference. In overview, a plasma mass filter includes a substantially cylindrical shaped wall which surrounds a hollow chamber. A magnetic field is generated in the chamber which is generally axially oriented and an electric field is generated within the chamber which is oriented substantially perpendicular to the longitudinal axis of the chamber. Importantly, for operation of a plasma filter, the electric field has a positive potential on the axis relative to the wall which is usually at a zero potential. When a multi-species plasma is injected into the chamber, the plasma interacts with the crossed electric and magnetic fields, resulting in the rotation of the plasma about the chamber axis. In response to the crossed electric and magnetic fields, each ionized or charged particle in the multi-species plasma will travel on a predictable trajectory about the axis as it transits the chamber. The particular trajectory is dependent on the mass to charge ratio of the orbiting particle. With this in mind, the plasma mass filter is designed so that high mass particles will travel on unconfined orbits that allow the high mass particles to strike and be collected on the wall of the chamber. On the other hand, the low mass particles will have orbits that are smaller than the chamber radius, and hence are confined inside the chamber so as not to strike the chamber walls. Thus, the orbiting low mass particles eventually exit the chamber at one end of the cylinder where they need to be collected.

When salt vapors, such as sodium hydroxide vapors (NaOH), are introduced into the vacuum chamber, along with the multi-species plasma discussed above, a mechanism for collecting the low mass particles (light ions) in the plasma can be provided. To appreciate how this can be accomplished, certain characteristics of sodium hydroxide need to be considered. Specifically, these characteristics need to be considered in a context where ions derived from a salt, such as sodium hydroxide (NaOH) come into contact with a solid wall or plate. For this consideration, reference here is first made to FIG. 1.

With reference to FIG. 1, it is known that when plasma ions derived from a salt come into contact with a solid wall 10 they will be neutralized and reform into a salt. If the wall 10 is cold enough (e.g. <100° C.), the salt will deposit faster than it evaporates and a layer of the salt will grow. Initially, the salt will deposit as a solid, forming a protective layer on the wall. However, as this layer grows, its surface temperature will increase, since salts are good insulators and there is a heat load on the wall from the plasma. Eventually, however, the surface will melt to create a molten layer 12. Deposition of additional salt will increase the thickness of the molten layer 12. In a steady state, molten salt will flow away at the same rate as the plasma deposits it. In addition, other ion species from the plasma will be neutralized and collected. Under these conditions, if the throughput of ions from other species is small enough, compared to the throughput of ions from the salt, then the other species will be incorporated into the molten layer. Thus, the other species will either be dissolved in the molten salt or will form micro-crystals that will be carried along by the molten salt. This provides a mechanism of draining both the molten salt and the other species off of the collector.

It happens that the draining of the molten salt off of the collector depends on the rate at which the molten salt is deposited. If the deposition rate is small, then gravity is the primary force driving the flow of the molten salt. In this case, the molten salt can be drained off the bottom of a flat collector plate. On the other hand, if the deposition rate is high, then the primary force driving the flow of the molten salt is the "plasma wind" force that arises because the molten layer absorbs momentum from the plasma. In that case, the molten salt can be drained off the side of a vertical collector plate. Or, the collector can be formed as a series of concentric cones and the molten layer can be drained off the back of the cones.

For the conditions mentioned above, the molten salt collector works best on salts that have a low vapor pressure in the molten state such as sodium hydroxide (NaOH). Accordingly, sodium hydroxide is used only as an example herein.

As mentioned above, if the deposition rate of the sodium hydroxide is relatively small, gravity is the primary force driving the molten layer. For example, if the plasma deposits sodium hydroxide onto a flat collector plate that is tilted at an angle $\alpha$ with respect to vertical, as shown in FIG. 1 in a steady state, the gravitational force is balanced by the viscous drag:

$$0 = \rho g \cos\alpha + \eta \frac{\partial^2 u}{\partial z^2},$$

where $\rho$ is the mass density, $\eta$ is the viscosity, and u is the velocity of the molten NaOH along the collector plate. Inertial terms in the fluid equations have been neglected. Solving this equation with the boundary conditions $u(z=0)=0$ and $\partial u/\partial z(z=d)=0$ gives:

$$u(z) = \frac{\rho g \cos\alpha}{\eta} d^2 \left( \frac{z}{d} - \frac{z^2}{2d^2} \right),$$

where d is the local thickness of the molten layer 12.

The average axial velocity is then:

$$\overline{u} = \frac{1}{d} \int_0^d u\,dz = \frac{\rho g d^2 \cos\alpha}{3\eta}.$$

The thickness of the molten layer, d, is determined by conservation of mass:

$$\frac{\partial}{\partial y}(\rho \bar{u} d) = m\Gamma\cos\alpha,$$

where y is the distance along the plane of the collector, Γ is the ion flux, and m is the average ion mass. Solving this equation gives:

$$d = \left(\frac{3\eta m\Gamma}{\rho^2 g} y\right)^{1/3} \approx 0.053\left(\frac{y}{R_w}\right)^{1/3} \text{ mm}$$
$$u = \left(\frac{gm^2\Gamma^2}{3\rho\eta} y^2\right)^{1/3} \cos\alpha \approx 0.42\cos\alpha\left(\frac{y^2}{R_w^2}\right)^{1/3} \text{ cm/s},$$

where it is assumed that d=0 and hence $\bar{u}$=0 at y=0. Also, the following values for the parameters have been used:

| ρ | η | Γ | m | $R_w$ |
|---|---|---|---|---|
| 1800 kg/m$^3$ | 0.004 Pa-s | 0.05 mol/m$^2$/s | 13.33 amu | 0.6 m |

Note that in this example the thickness d is not explicitly dependent on the tilt angle α. This is because the reduction in the driving force is cancelled by the spreading out of the ion flux. Assuming that y<8$R_W$, we find that d<0.1 mm. The flow velocity is less than 1 cm/s, indicating that it takes around a minute for a deposited atom to leave the collector plate. In this case, a trough can be placed below the collector plate to catch the molten sodium hydroxide.

As the plasma imparts a heat load on the molten NaOH layer, the surface temperature of the NaOH is given by:

$$T_s = T_m + qd/\kappa,$$

where $T_m$=322° C. is the melting temperature of sodium, q≈0.5 MW/m$^2$ is the heat load from the plasma, and κ≈1 W/m/K is the thermal conductivity of the molten NaOH. For d=0.11 mm the surface temperature is $T_S$=372° C., still well below the vaporization temperature of NaOH. Note that the viscosity decreases with temperature, but d is only weakly dependent on viscosity.

Unlike the conditions just described, if the deposition rate of sodium hydroxide is high, then the "plasma wind" forces become the primary forces driving the molten layer. In this condition, the current density in the molten layer, j, crossed with the magnetic field, B, results in a Lorentz force on the molten layer that is small compared to the plasma wind since the molten NaOH is more resistive than the plasma. With this in mind, the plasma wind force arises because the molten layer 12 absorbs momentum from the flowing plasma. If the collector plate is vertical, then the rotation of the plasma drives the molten layer in the azimuthal direction. Averaged over the depth of the molten layer, the plasma wind force density is:

$$f_p = \frac{m\Gamma\omega}{d}(-y\hat{x} + x\hat{y}),$$

where ω is the rotation frequency of the plasma and the (x=0, y=0) refers to the axis of the machine. In this case it is assumed the rotation frequency and ion flux are uniform. Force balance in the x-y plane is then given by:

$$\rho u\cdot\nabla u_x = -\frac{m\Gamma\omega}{d}y + \eta\frac{\partial^2 u_x}{\partial z^2}$$
$$\rho u\cdot\nabla u_y = +\frac{m\Gamma\omega}{d}x + \eta\frac{\partial^2 u_y}{\partial z^2} - \rho g,$$

where gravity points in the −y direction. Assuming that d is uniform, we can remove gravity from the equations by defining $$x' = x - \frac{\rho g d}{m\Gamma\omega}.$$

The equations then become:

$$\rho u\cdot\nabla u_{x'} = -\frac{m\Gamma\omega}{d}y + \eta\frac{\partial^2 u_{x'}}{\partial z^2}$$
$$\rho u\cdot\nabla u_y = +\frac{m\Gamma\omega}{d}x' + \eta\frac{\partial^2 u_y}{\partial z^2}.$$

To solve these equations, three things must be done. These are: first, convert to polar coordinates with the origin defined as (x'=0, y=0); second, neglect all inertial terms except centrifugal force; and third, change the form of the plasma wind force density to reflect the fact that it does not act volumetrically on the molten layer. Rather, it acts only on the surface. The equations are now:

$$-\rho\frac{u_\theta^2}{r} = \eta\frac{\partial^2 u_r}{\partial z^2}$$
$$0 = \frac{m\Gamma\omega}{a}\frac{\exp(z/a)}{\exp(d/a)-1}r + \eta\frac{\partial^2 u_\theta}{\partial z^2}.$$

Here it is assumed that the plasma wind force increases exponentially with z towards the surface of the molten layer. Solving for $u_\theta$ in the limit where d>>α gives:

$$u_\theta(z) = \frac{m\Gamma\omega r}{\eta}z.$$

The azimuthal velocity is just proportional to z. It is now possible to solve for the radial flow that is driven by the centrifugal force:

$$u_r = \frac{\rho d^3}{3\eta}\left(\frac{m\Gamma\omega}{\eta}\right)^2 rz\left(1 - \frac{z^3}{4d^3}\right).$$

The z-averaged velocities are:

$$\bar{u}_\theta = \frac{m\Gamma\omega d}{2\eta}r$$
$$\bar{u}_r = \frac{3\rho d^4}{20\eta}\left(\frac{m\Gamma\omega}{\eta}\right)^2 r.$$

As before, the thickness of the layer is found using mass conservation:

$$\frac{1}{r}\frac{\partial}{\partial r}(\rho\bar{u}_r d) = sm\Gamma,$$

where s is the sticking coefficient of the incoming ions. Ions which do not stick are assumed to still impart their full momentum to the melt.

Solving the equation with typical numbers, and using a sticking coefficient of s=1 gives:

$$d=\left(\frac{10}{3}\frac{s\eta^3}{\rho^2 m\Gamma\omega^2}\right)^{1/5}\approx 0.15\ \text{mm}$$
$$\bar{u}_\theta=\left(\frac{5}{48}\frac{sm^4\Gamma^4\omega^3R_w^5}{\rho^2\eta^2}\right)^{1/5}\frac{r}{R_w}\approx 25.1\frac{r}{R_w}\ \text{cm/s}\quad.$$
$$\bar{u}_r=\left(\frac{3}{320}\frac{s^4m^6\Gamma^6\omega^2R_w^5}{\rho^3\eta^3}\right)^{1/5}\frac{r}{R_w}\approx 0.061\frac{r}{R_w}\ \text{cm/s}$$

Above, it is assumed that ω=34200 rad/s. Note that the azimuthal velocity is much faster than the gravity driven flow. From the values of $u_\theta$ and $u_r$ it can be seen that the molten NaOH flows in a tight spiral; the streamlines circle the origin over 100 times between r=0 and $r=R_w$. Gravity acts to shift this spiral in the +x direction a distance:

$$\Delta x=\frac{\rho g d}{m\Gamma\omega}=\left(\frac{10}{3}\frac{sg^5\rho^3\eta^3}{m^6\Gamma^6\omega^7}\right)^{1/5}\approx 12\ \text{cm.}$$

At (x, y)=(Δx, 0), the plasma wind force balances the gravitational force, so the velocity is zero at this point. Because of this shift, the molten sodium hydroxide can be drained off of the collector at the point where the edge of the collector intersects the x-axis.

For the specific condition wherein the collector is conical section 14, then the plasma wind force along the magnetic field has a component along the surface of the cone that will drive the molten NaOH backwards and out radially (see FIG. 2). Ignoring gravity and the centrifugal force, the force balance equations are:

$$0=\frac{m\Gamma v_b}{a}\frac{\exp(z/a)}{\exp(d/a)-1}\sin\alpha+\eta\frac{\partial^2 u_y}{\partial z^2}\quad,$$
$$0=\frac{m\Gamma\omega}{a}\frac{\exp(z/a)}{\exp(d/a)-1}r+\eta\frac{\partial^2 u_\theta}{\partial z^2}$$

where $\hat{y}=\cos\alpha\hat{r}+\sin\alpha\hat{b}$ is now the radially outward direction along the surface of the cone, $\hat{b}$ is the direction of the magnetic field, α is the angle of the cone with respect to vertical (α=0 is a vertical plate), z is the direction perpendicular to the surface of the cone, and $v_b\approx10^4$ m/s is the plasma velocity parallel to the magnetic field. Solving the equations, letting a→0, and z-averaging gives:

$$\bar{u}_\theta=\frac{m\Gamma\omega r}{2\eta}d\quad.$$
$$\bar{u}_y=\frac{m\Gamma v_b}{2\eta}d\sin\alpha$$

Again, the thickness d is found by using conservation of mass.

$$2\pi r d\rho\bar{u}_y=m\Gamma\pi(r^2-r_0^2),$$

where $r_0$ is the radius of the leading edge of the cone. Solving the equations with the boundary condition $d(r_0)=0$ gives:

$$d=\sqrt{\frac{\eta(r^2-r_0^2)}{\rho v_b r\sin\alpha}}$$
$$\bar{u}_\theta=\frac{m\Gamma\omega}{2}\sqrt{\frac{r(r^2-r_0^2)}{\eta\rho v_b\sin\alpha}}\quad.$$
$$u_y=\frac{m\Gamma}{2}\sqrt{\frac{v_b(r^2-r_0^2)\sin\alpha}{\eta\rho r}}$$

The maximum value of the thickness and flow velocity is reached where $|r-r_0|$ is maximum. Defining $D=\max|r-r_0$, and assuming $D\gg r_0$, the maximum values are given by:

$$\max\ d=\sqrt{\frac{2\eta D}{\rho v_b|\sin\alpha|}}\approx 6.8\times10^{-3}\ \text{mm}$$
$$\max\ \bar{u}_\theta=\frac{m\Gamma\omega}{2}\sqrt{\frac{2DR_w^2}{\eta\rho v_b|\sin\alpha|}}\approx 1.12\ \text{cm/s}$$
$$\max\ \bar{u}_y=\frac{m\Gamma}{2}\sqrt{\frac{2v_bD|\sin\alpha|}{\eta\rho}}\approx 0.54\ \text{cm/s}$$

The +/− sign refers to the sign of the angle α. In the limit that $r_0\approx R_w\gg D$, L=3D, $\sin\alpha=\sqrt{9/10}$, and D=0.1 m, the maximum values of d and u are independent of the sign of α and have the values shown. Note that the velocity at which the NaOH leaves the collector, $u_y$, is much larger than in the flat plate cases discussed above. This is because the plasma wind directly contributes to the flow of the waste off of the collector. The sodium hydroxide can be drained off of the collector at the back edge 16 of the conical section 14.

In light of the above it is an object of the present invention to provide a molten collector which can be incorporated into the structure of a plasma mass filter for the collection and removal of low mass particles from a multi-species plasma. It is another object of the present invention to provide a molten collector that allows for the efficient and uninterrupted removal of low mass particles from the collector during a continual operation of the filter. Still another object of the present invention is to provide a molten collector which uses the "plasma wind" force to direct the removal of low mass particles in a molten salt from a plasma mass filter. Yet another object of the present invention is to provide a molten collector which is easy to use, relatively simple to manufacture, and comparatively cost effective.

SUMMARY OF THE PREFERRED EMBODIMENTS

A device for collecting metal ions from a plasma and then removing them from a vacuum chamber includes at least one collector plate that is positioned inside the chamber. Preferably, there are a plurality of such collector plates and each collector plate is formed as a generally truncated conical section. In particular, all of the conical sections are concentrically mounted in the vacuum chamber relative to a defined axis of the chamber, and they are placed in a substantially coplanar arrangement. Also, the conical sections are angled relative to the axis with a separation space between them. In this arrangement, the conical sections overlap each other so as to effectively screen a cross section of the chamber. Importantly, each conical section is formed with an internal cooling channel.

The device of the present invention also includes a fluid pump that is connected in fluid communication with the cooling channels of the conical sections. For the purposes of the present invention, the pump is used for pumping a liquid coolant, such as water, through each of the cooling channels. The purpose here is to maintain each of the conical sections at a temperature of approximately 100° C. during the operation of the vacuum chamber.

An injector, mounted on the chamber, is used to introduce a salt, which may or may not be vaporized, and a multi-species plasma into the chamber. Specifically, the salt is preferably sodium hydroxide, and the multi-species plasma will be generated with oxides from a group which may include, but is not limited to, aluminum oxide, silicon oxide, calcium oxide, iron oxide, chromium oxide and uranium oxide. Insofar as the salt is concerned, if sodium hydroxide (NaOH) is used, it is expected that the salt will be fully dissociated in sodium (Na), oxygen (O), and hydrogen (H) atoms. Further, the sodium atoms, and possibly the oxygen and hydrogen atoms, will be ionized along with the multi-species plasma.

In the operation of the present invention, the salt (e.g. sodium hydroxide) is introduced into the chamber by the injector so as to have a predetermined throughput. Further, as envisioned by the present invention the plasma will be introduced into the chamber as a multi-species plasma that includes both relatively light metal ions of low mass/charge ratios ($M_1$) and relatively heavy metal ions of high mass/charge ratios ($M_2$). Importantly, the multi-species plasma is introduced into the chamber by the injector so that the metal ions in the plasma will have a predetermined throughput that is less than the throughput value of the salt.

Initially, due to the temperature differential between the plasma and the cooled collector plate inside the vacuum chamber, as the salt collides with the collector plates (conical sections) they will reform to create a solid deposit on the collector plates. With a continued build-up of solid salt on the collector plates, however, and the consequent thermal insulation that results, subsequent deposits of salt on the now-insulated collector plates will not completely solidify. Instead, this salt (sodium hydroxide) will assume a molten state. Importantly, the molten state is maintained at a temperature that causes the salt to deposit on the collector plates at a higher rate than it will evaporate from the collector plates. For some conditions, this may require the use of heaters.

As indicated above, along with the salt (sodium hydroxide), both light ions ($M_1$) and heavy ions ($M_2$) of the plasma will be inside the chamber. For the purposes of the present invention, it is envisioned that the light ions and heavy ions will be separated from each other while they are in the vacuum chamber, such as by the use of plasma mass filter techniques disclosed by Ohkawa in U.S. Pat. No. 6,096,220. Specifically, in accordance with these techniques, the light metal ions and the heavy metal ions are directed onto different trajectories inside the chamber. More specifically, the heavy ions are directed into contact with the chamber wall, where they are subsequently collected. On the other hand, the light metal ions are directed onto trajectories that cause them to transit through the chamber. Accordingly, the collector plates (conical sections) of the device of the present invention are positioned so that the light metal ions will collide with the collector plates after passing through the chamber. In these collisions, the light metal ions become embedded in the molten sodium hydroxide that has become deposited on the collector plates. Then, the molten sodium hydroxide, along with the light metal ions that are trapped therein, are caused to be removed from the vacuum chamber under the influence of either the plasma wind in the chamber, or gravitational forces. Further, by properly aligning the angle of the conical sections (collector plates) with respect to the plasma wind, the plasma wind force can be used to channel the molten material to a desired location.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
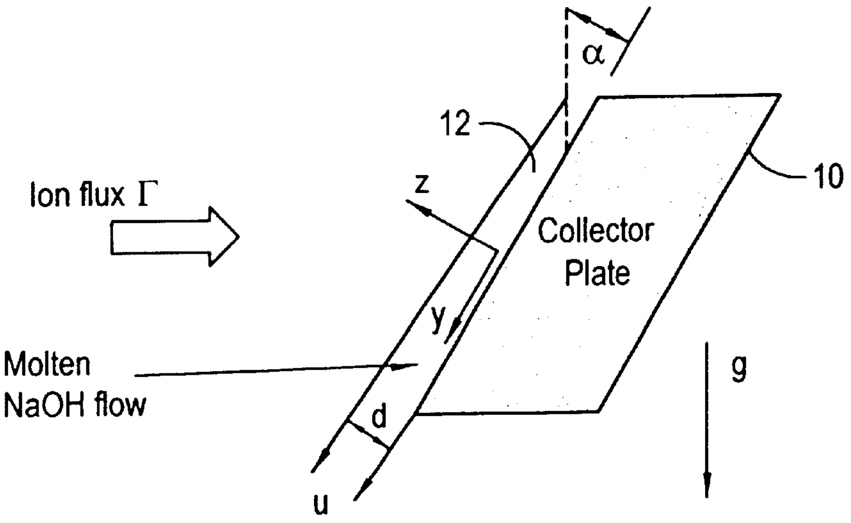
FIG. 1 is a schematic drawing of a salt deposition on a solid surface under operational conditions.
Figure 2:
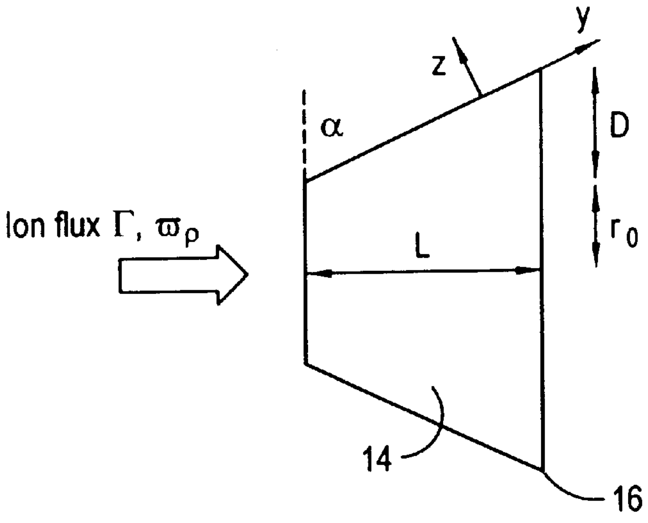
FIG. 2 is a schematic drawing of a salt deposition on a truncated conical section under operational conditions.
Figure 3:
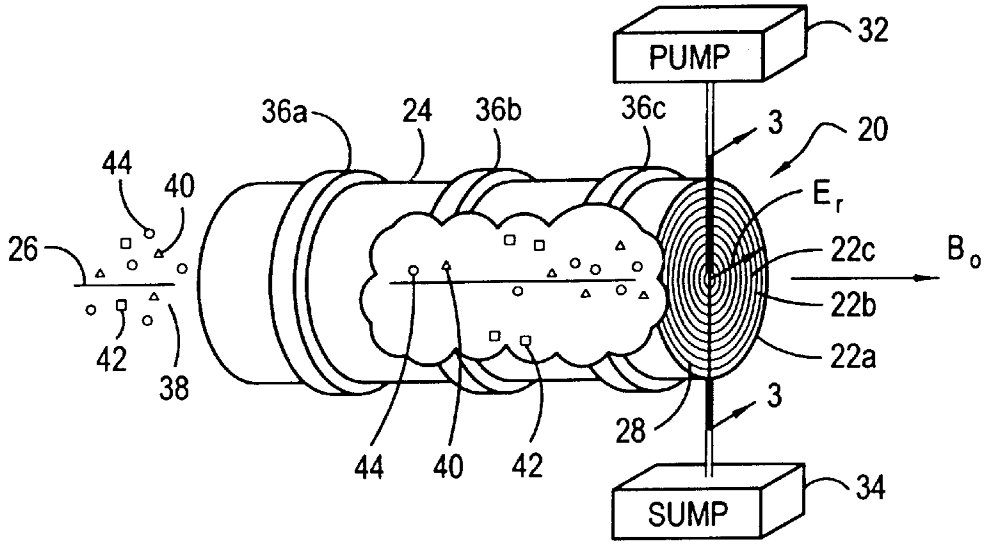
FIG. 3 is a perspective view of a vacuum chamber as used for the present invention with portions broken away or removed for clarity.

Referring now to FIG. 3, a collector in accordance with the present invention is shown and designated 20. As shown, the collector 20 preferably includes a plurality of annular-shaped conical sections 22 of which the conical sections 22*a*, 22*b* and 22*c* are only exemplary. Further, the collector 20 is shown to be included as a component of a generally cylindrical shaped vacuum chamber 24 which defines a longitudinal axis 26. Within this structure, all of the conical sections 22 in the collector 20 are concentrically mounted in the vacuum chamber 24 around the axis 26. Also, as shown, the conical sections 22 are placed in a substantially coplanar arrangement. By cross referencing FIG. 3 with FIG. 4 it will be appreciated that the conical sections 22 are angled relative to the axis 26 and that there is a separation space 28 between juxtaposed conical sections 22. For example, in FIG. 4 the separation space 28*a* is shown between conical sections 22*a* and 22*b*. Similarly, the separation space 28*b* is shown between the conical sections 22*b* and 22*c*. In this arrangement, the conical sections 22 overlap each other so as to effectively screen a cross section of the chamber 24. More particularly, as shown in FIG. 3, the collector 20 is preferably placed at an end of the chamber 24.

Figure 4:
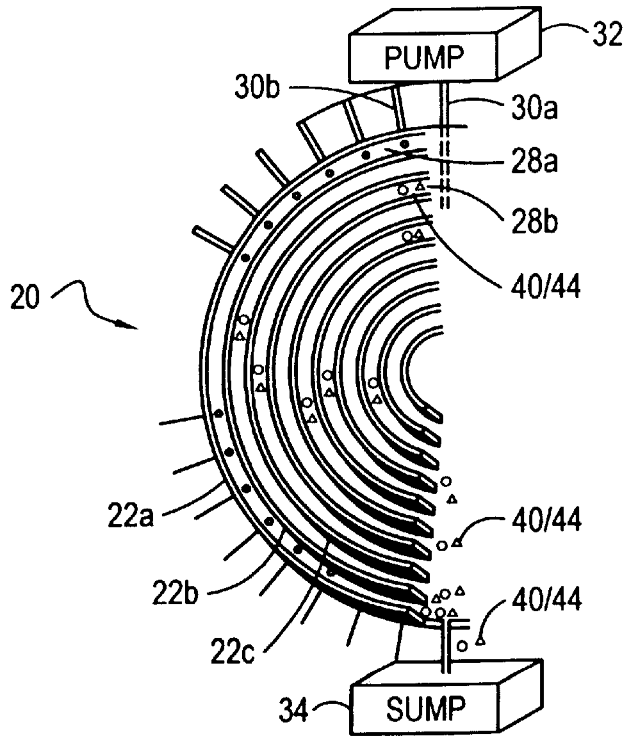
FIG. 4 is a perspective cross sectional view of the collector of the present invention as seen along the line 3—3 in FIG. 3.

Still cross referencing FIG. 3 and FIG. 4, it will be appreciated that each conical section 22 is formed with a respective internal cooling channel 30. Further, each respective internal cooling channel 30 is connected in fluid communication with a fluid pump 32. In the context of the present invention, the purpose of the fluid pump 32 is to circulate a cooling fluid, such as water, through the conical sections 22 of the collector 20. This is done to maintain the conical sections 22 at a substantially constant predetermined temperature (e.g. 100° C.). Both FIG. 3 and FIG. 4 also show that the vacuum chamber 24 is operationally connected with a sump 34. In FIG. 3 it is also shown that magnetic coils 36 (the magnetic coils 36*a–c* are only exemplary) are mounted on the vacuum chamber 24 to function in a manner well known in the pertinent art. Specifically, the magnetic coils 36 are used to create a magnetic field $B_o$ that is oriented substantially parallel to the axis 26 in the vacuum chamber 24. Also, an electrode assembly of a type well known in the pertinent art (not shown) is used to generate an electric field, $E_r$, in the vacuum chamber 24 that is substantially perpendicular to the axis 26. Preferably, the electric field, $E_r$, has a positive potential along the axis 26, and a substantially zero potential at the wall of the vacuum chamber 24. In any event, crossed electric and magnetic fields ($E_r \times B_o$) are established inside the vacuum chamber 24.

In the operation of the present invention, a vaporized mixture 38 is introduced into the vacuum chamber 24. For the purposes of the present invention, this introduced mixture 38 will typically include light metal ions 40 (mass/charge ratio $M_1$), heavy metal ions 42 (mass/charge ratio $M_2$) and ions of dissociated sodium hydroxide salt 44. Importantly, the throughput of the dissociated salt 44 should be higher than the throughput of the metal ions 40. Under the influence of the crossed electric and magnetic fields ($E_r \times B_o$) inside the vacuum chamber 24, the light metal ions 40 will be separated from the heavy metal ions 42 in a manner discussed above with reference to the Ohkawa patent. Suffice to say, due to this separation, the light metal ions 40 and the vapors of sodium hydroxide 44 are directed from the vacuum chamber 24 onto the collector 20.

As disclosed above, operation of the fluid pump 32 is intended to maintain the conical sections 22 of the collector 20 at a temperature that will maintain the conical sections 22 at a temperature below the melt temperature of the salt (NaOH) 44. Accordingly, because the melt temperature of the sodium hydroxide 44 is relatively low, vapors of the sodium hydroxide 44 will tend to solidify upon contact with the relatively cooler conical sections 22. The initial result of this contact is the formation of the solid layer. However, as discussed above, subsequent to the formation of the solid layer, a molten layer 12 will develop on the conical sections 22. Importantly, this molten layer 12 of a salt (e.g. sodium hydroxide 44) is useful for trapping the light metal ions 40 that, with the vapors (ions) of sodium hydroxide 44, have transited the vacuum chamber 24. Further, it is desirable to maintain the temperature of the conical sections 22 at a temperature so that the salt 44 will deposit on the conical sections 22 at a faster rate than it will evaporate therefrom. As also discussed above, the molten state of the sodium hydroxide 44 can be controlled so that the molten sodium hydroxide 44, along with the entrapped light metal ions 40, will flow and drip from the conical sections 22 in a predetermined manner. For example, in FIG. 4 where the molten sodium hydroxide and the entrapped light metal ions are designated in combination as 40/44, the combination 40/44 will either flow along the particular conical section 22 or drip to the next lower conical section 22 under the influence of gravitational forces, g. As shown, at the bottom of the collector 20, the combination 40/44 can be collected in a sump 34 for further processing. Alternatively, the "plasma wind" in the chamber 24 will drive the combination 40/44 to the edges 16 of the conical sections 22 where it can be collected.

It is an important aspect of the present invention that the above-described operation is completed within the vacuum environment established by the vacuum chamber 24. Thus, from the time the vaporized mixture 38 is first introduced into the vacuum chamber 24, until the combination 40/44 is transferred by gravity or the plasma wind from the collector 20 to the sump 34, there is never a need to compromise the vacuum inside the vacuum chamber 24. Thus, importantly, the present invention can be operated on a continuous basis.

While the particular Molten Salt Collector for Plasma Separations as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A metal ion collection device which comprises:

a vacuum chamber;

a means for introducing a salt into said chamber for dissociation therein, said salt having a first throughput value;

a means for introducing a plasma along with said salt into said chamber, wherein said plasma includes metal ions having a second throughput value less than said first throughput value;

a collector plate positioned in said chamber for causing said salt to deposit and reform on said collector plate in a molten condition to trap said metal ions therein;

a means for maintaining a temperature for said molten salt on said collector plate to establish a deposit rate and an evaporation rate for said salt wherein said deposit rate is greater than said evaporation rate; and a means for continuously removing said molten salt, together with said metal ions trapped therein, from said chamber.

2. A device as recited in claim 1 wherein said salt is sodium hydroxide.

3. A device as recited in claim 1 wherein said plasma is a multi-species plasma generated using oxides selected from a group consisting of aluminum oxide, silicon oxide, calcium oxide, iron oxide, chromium oxide and uranium oxide.

4. A device as recited in claim 1 comprising a plurality of said collector plates, wherein each said collector plate is a truncated conical section, with said plurality of sections being concentrically oriented and placed in a coplanar arrangement.

5. A device as recited in claim 4 wherein each said section overlaps at least one other said section to screen a cross section of said chamber.

6. A device as recited in claim 1 comprising a plurality of said collector plates wherein each said collector plate is formed with at least one internal cooling channel, and said device further comprises a fluid pump connected in fluid communication with said cooling channels of said collector plates for pumping a liquid coolant therethrough to maintain each said collector plate at a temperature below the melting temperature of said salt to form a portion of said salt as a protective layer of solid salt on said collector plate, and to maintain said molten salt on said collector plate at a temperature causing deposition of said salt thereon at a faster rate than evaporation of said salt therefrom.

7. A device as recited in claim 1 wherein said plasma is a multi-species plasma including relatively light metal ions and relatively heavy metal ions, and wherein said light metal ions are trapped in said molten portion of said salt after said light metal ions have been separated from said heavy metal ions in said chamber.

8. A device as recited in claim 1 further comprising a heating means for maintaining at least a portion of said salt in the molten condition.

9. A metal ion collection device which comprises:

a vacuum chamber;

a plurality of substantially truncated conical sections, said plurality of conical sections being concentrically mounted in said vacuum chamber in a substantially coplanar arrangement to screen a cross section of said chamber, each said conical section being formed with an internal cooling channel;

an injector for introducing a salt into said chamber for dissociation of said salt in said chamber, said salt having a first throughput value, and for introducing a plasma including metal ions into said chamber, said metal ions having a second throughput value;

a fluid pump in fluid communication with said respective cooling channels of each said conical section for pumping a liquid coolant therethrough to substantially maintain said conical sections at a temperature below the melting temperature of said salt to form a portion of said salt as a solid protective layer on each said conical section, and to cause said salt in said chamber to thereafter deposit on said solid protective layer in a molten condition at a faster rate than evaporation of said salt therefrom for trapping said metal ions therein; and a means for continuously removing said molten portion of said mixture, together with said metal ions trapped therein, from said chamber.

10. A device as recited in claim 9 wherein said salt is sodium hydroxide.

11. A device as recited in claim 9 wherein said plasma is a multi-species plasma generated using oxides selected from a group consisting of aluminum oxide, silicon oxide, calcium oxide, iron oxide, chromium oxide and uranium oxide.

12. A device as recited in claim 9 wherein said liquid coolant is water.

13. A device as recited in claim 9 wherein said plasma is a multi-species plasma including relatively light metal ions and relatively heavy metal ions, and wherein said light metal ions are trapped in said molten portion of said mixture after said light metal ions have been separated from said heavy metal ions.

14. A device as recited in claim 9 further comprising a heating means for maintaining at least a portion of said salt in the molten condition.

15. A method for removing metal ions from a plasma in a vacuum chamber which comprises the steps of:

mounting a plurality of truncated conical shaped collector plates in said vacuum chamber in a substantially concentric and coplanar arrangement to screen a cross section of said chamber, each said collector plate being formed with an internal cooling channel;

introducing a salt into said chamber for dissociation of said salt in said chamber, said salt having a first throughput value;

introducing a plasma including metal ions into said chamber, said metal ions having a second throughput value;

pumping a liquid coolant into said cooling channels to substantially maintain said collector plates at a temperature for forming a portion of said salt as a solid protective layer on said collector plate, and causing said salt in said chamber to thereafter deposit on said solid protective layer in a molten condition at a faster rate than evaporation of said salt therefrom for trapping said metal ions therein; and continuously removing said molten portion of said mixture, together with said metal ions trapped therein, from said chamber.

16. A method as recited in claim 15 wherein said salt is sodium hydroxide.

17. A method as recited in claim 16 further comprising the steps of:

selecting an oxide from a group consisting of aluminum oxide, silicon oxide, calcium oxide, iron oxide, chromium oxide and uranium oxide; and generating said plasma with said oxide.

18. A method as recited in claim 17 wherein said liquid coolant is water.

19. A method as recited in claim 17 wherein said plasma is a multi-species plasma including relatively light metal ions and relatively heavy metal ions, and wherein said light metal ions are trapped in said molten portion of said mixture after said light metal ions have been separated from said heavy metal ions.

20. A method as recited in claim 17 further comprising the step of heating said collector plates to maintain at least a portion of said salt in the molten condition.

* * * * *

UNITED STATES PATENT AND TRADEMARK OFFICE

CERTIFICATE OF CORRECTION

PATENT NO. : 6,632,369 B2 Page 1 of 1
DATED : October 14, 2003
INVENTOR(S) : Brian P.Cluggish, Stephen F. Agnew and Sergei Putvinski It is certified that error appears in the above-identified patent and that said Letters Patent is hereby corrected as shown below:

Column 3,
Line 42, delete “d=0.11” insert -- $d$=0.1 --

Signed and Sealed this

Eleventh Day of May, 2004

JON W. DUDAS
*Acting Director of the United States Patent and Trademark Office*